United States Patent [19]

Kehlhofer

[11] Patent Number: 4,729,217
[45] Date of Patent: Mar. 8, 1988

[54] COMBINED GAS/STEAM POWER STATION PLANT

[75] Inventor: Rolf Kehlhofer, Meilen, Switzerland

[73] Assignee: BBC Brown, Boveri & Company, Limited, Baden, Switzerland

[21] Appl. No.: 51,246

[22] Filed: May 15, 1987

Related U.S. Application Data

[63] Continuation of Ser. No. 689,187, Jan. 7, 1985, abandoned.

[30] Foreign Application Priority Data

Jan. 31, 1984 [CH] Switzerland .............................. 443/84

[51] Int. Cl.⁴ .......................... F02B 43/00; F02C 6/00; F02G 1/00
[52] U.S. Cl. .................................... 60/39.02; 60/39.12; 60/39.182; 60/39.464
[58] Field of Search ............... 60/39.02, 39.182, 39.12, 60/39.464; 122/4 D, 7; 431/170; 110/244, 245

[56] References Cited

U.S. PATENT DOCUMENTS

| | | | |
|---|---|---|---|
| 3,868,817 | 3/1975 | Marion et al. | 60/39.12 |
| 4,019,314 | 4/1977 | Springmann | 60/39.12 |
| 4,058,974 | 11/1977 | Pfenninger | 60/39.12 |
| 4,158,948 | 6/1979 | Schlinger | 60/39.12 |
| 4,250,704 | 2/1981 | Bruckner et al. | 60/39.12 |

Primary Examiner—Louis J. Casaregola
Assistant Examiner—Timothy S. Thorpe
Attorney, Agent, or Firm—Burns, Doane, Swecker & Mathis

[57] ABSTRACT

In a combined gas/steam turbine power station plant with integrated coal gasification, the gas turbine combustion chamber and auxiliary firing in the exhaust heat steam generator are fired with fuel gas from the gas generator with nitrogen from the air separation plant being previously mixed with the fuel gas.

4 Claims, 4 Drawing Figures

COMBINED GAS/STEAM POWER STATION PLANT

This application is a continuation of application Ser. No. 689,187 filed Jan. 7, 1985, now abandoned.

BACKGROUND AND SUMMARY OF THE INVENTION

The concept of a "combined gas/steam turbine power station plant"—hereafter referred to as a combined plant—is always understood, in the following, to mean a gas turbine group with at least one downstream steam turbine cycle, the gas turbine exhaust heat being utilised in an exhaust heat boiler to produce the steam necessary to supply a steam turbine.

As is known from German Pat. No. 2,524,723, the exhaust heat steam generator is equipped with auxiliary firing equipment to increase the steam turbine power. This auxiliary firing equipment and the gas turbine combustion chamber are fired by a fuel gas which is obtained from a gas generator operating by coal gasification.

This cycle has the disadvantage, however, that air is used for the coal gasification, with the effect that a fuel gas of low calorie value is obtained. A further disadvantage of this cycle lies in the fact that the high gas turbine entry temperature, together with a high pressure ratio to improve the process efficiency, lead to a high $NO_X$ emission rate. The same also applies to the auxiliary firing in the exhaust gas steam generator.

Now gas turbines are increasingly subject—with respect to exhaust gas composition—to the strict environmental protection regulations of many states. In particular, great difficulties are involved in keeping within the maximum permitted $NO_X$ emission regulations. Thus, legal regulations are currently in force—in the USA, in particular—which state that the $NO_X$ emission content must not exceed approximately 75 ppm at 15% $O_2$ by volume. Similar regulations have to be observed in most industrial states and it is to be expected that the permissible emission figures will tend to be corrected downwards in future.

It is known from the journal "Brown-Boveri-Mitteilung", Volume 65, CH-Baden, October 1978, in particular page 649, that water or a quantity of steam extracted from the process may be respectively injected or introduced into the gas turbine combustion chamber as an $NO_X$ reduction measure.

If water is injected into the combustion chamber, a reduction in the flame temperature and, in consequence, a noticeable deterioration of the efficiency of the overall process is to be expected. Furthermore, water is not always and everywhere present in usable quantities— in low precipitation regions, for example—particularly if use of the water available locally to maintain the combined process has to be given priority. In addition, the water requires treatment before it can be used because many of the minerals present in the water, such as sodium, common salt, etc., have a very corrosive effect on the gas turbine. This treatment is, however, expensive.

The introduction of steam extracted from the process also leads to a deterioration in overall efficiency, even if the gas turbine entry temperature can be kept up using steam addition. Although the addition of steam to the gas turbine process produces an increase in total power, because of the additional mass flow, the result is, however, a reduction in efficiency because the additional consumption of fuel must be taken into account.

German Pat. No. 2,524,848 reveals the supply of a part of the compressed combustion air to the air decomposition installation, in which the air is separated into oxygen and nitrogen. The oxygen is provided for the operation of the gas producer and, the nitrogen is conducted into the gas turbine combustion chamber. Although this cycle permits a reduction in the $NO_X$ generated, it is, however, only a partial reduction. Furthermore, since these gas turbine exhaust gases are fed to the auxiliary firing equipment in the exhaust heat steam generator, the combustion occuring there again increases the $NO_X$ emissions to inadmissible values.

The invention is intended to help deal with the foregoing problem.

The objective of the invention is to minimise the $NO_X$ emissions in a combined plant of the type stated above, by integral nitrogen mixing.

Since, on the one hand, the gas turbine exhaust gases have a reduced $NO_X$ figure and, on the other, a mixture of fuel gas and nitrogen is employed for auxiliary firing in the exhaust heat steam generator, optimum minimisation of the $NO_X$ emissions can be achieved.

In further preferred embodiments, the fuel gas and nitrogen mixture is passed through one expansion turbine before firing in the combustion chamber and through another expansion turbine before auxiliary firing in the exhaust heat steam generator. The expansion turbines can drive generators or compressors. Where air compressors are used, the air decomposition plant can, in part, be mechanically driven.

BRIEF DESCRIPTION OF THE DRAWINGS

Exemplary embodiments of the invention are shown diagrammatically in the drawing.

In this.

DETAILED DESCRIPTION OF THE PREFERRED EMBODIMENTS

All the elements not necessary for direct understanding of the invention are omitted. The flow directions of the various working media are indicated by arrows. The same elements are provided with the same reference signs in the different figures.

Figure 1:
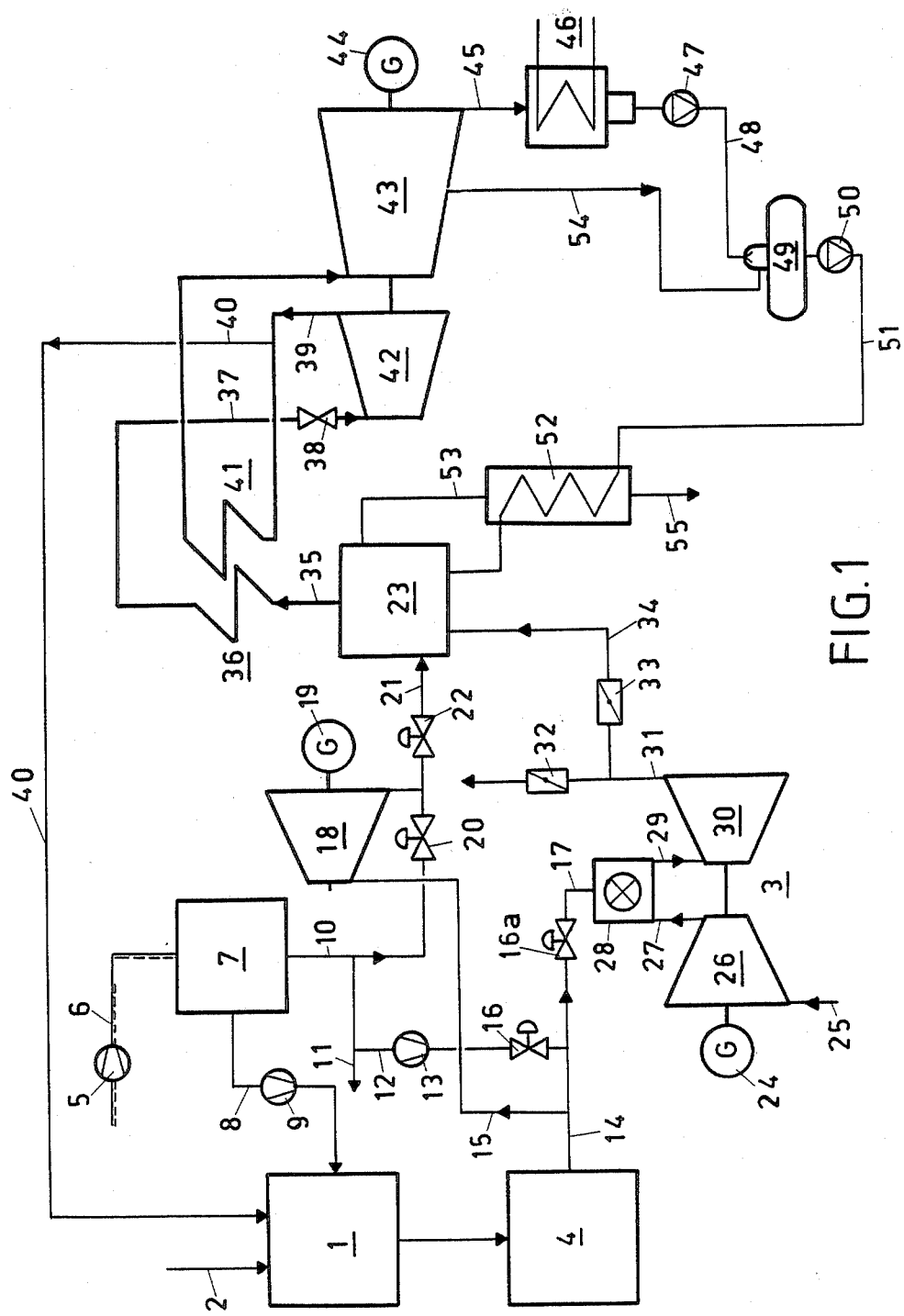
FIG. 1 shows a cycle for a combined gas/steam turbine power station plant with integrated coal gasification.

FIG. 1 shows a combined plant with integrated coal gasification. The combined plant itself consists of a combination of a gas turbine plant and steam turbine cycle. The integrated coal gasification fulfils the task of ensuring the preparation of the fuel gas necessary for operating the gas turbine and for auxiliary firing in the exhaust heat steam generator. The gas turbine group 3 consists essentially, as an autonomous unit, of a compressor 26, a gas turbine 30 connected to it, a generator 24 and a combustion chamber 28. The induced air 25 is compressed in the compressor 26 and arrives at the combustion chamber 28 via the duct 27. The hot gas prepared in the combustion chamber 28 is supplied as working medium to the gas turbine 30 via the duct 29. The gas turbine exhaust gases 31 are either led away via the flap valve 32 directly to atmosphere, a special operation or, in the normal case, are fed via the flap valve 33 and via the duct 34 to the exhaust heat steam generator 23. Part of the residual oxygen of the gas turbine exhaust gases 31 is used in the exhaust heat steam generator 23 in order to burn—as auxiliary firing—the fuel gas mixture 21, which is fed in via the control valve 22. The thermal energy released is used to generate high-pressure steam 35, which supplies the admission to the high-pressure turbine 42 via the superheater 36 and via the duct 37 and the control valve 38. After partial expansion 39, the steam is reheated in the resuperheater 41 and is then fed to the medium-pressure and low-pressure turbine 43. The high-pressure turbine 43 drive the generator 44. The fully expanded steam 45 is condensed in a water-on air-cooled condenser 46. Driven by the condensate pump 47, the condensate 48 then flows to the feed water tank and deaeration unit 49. Under cover of lost steam 54 from the MP+LP turbine 43, the sprayed-condensate 48 reaches the boiling-point and degas subsequently. The feed water pump 50 then pumps the water 51 through the economiser 52, heated by stack gases 53, into the exhaust gas steam generator 23. The cooled stack gases 55 are blown into the atmosphere via a chimney. This describes the operation of the combined plant.

The integrated coal gasification consists essentially of an air decomposition plant 7, a gas generator 1 and a gas cleaning plant 4. In the air separation plant 7, the air 6 compressed by the compressor 5, separated into oxygen 8 and nitrogen 10. The gas generator 1 is provided with coal 2 with the steam quantity 40, extracted from a suitable point in the steam turbine process, and the oxygen 8 acting as gasification agents. The oxygen 8 is further compressed in a compressor 9 in the supply line to the gas generator 1. The gas produced in the gasification plant 1 is then fed through the gas cleaning plant 4. After gas cleaning, the fuel gas is divided into two flows. One line 14 leads to the gas turbine combustion chamber 28; the other line 15 directs fuel gas, via the expansion turbine 18 connected to the generator 19, to the auxiliary firing in the exhaust heat steam generator 23. The nitrogen produced by the air separation plant 7 is also divided. A quantity of nitrogen 10 flows to the exhaust heat steam generator 23, first mixing with the fuel gas 15 flowing from the expansion turbine 18. The control valve 20 controls the nitrogen/fuel gas ratio. The control valve 22 subsequently controls the fuel gas mixture 21 fed to the auxiliary firing in the exhaust heat steam generator 23. A quantity of nitrogen 12 branched off from the nitrogen line 10 is compressed by compressor and then mixes with the fuel gas 14. The fuel gas/nitrogen ratio is controlled by the control valve 16. The control valve 16a subsequently controls the fuel gas mixture 17 fed to the gas turbine combustion chamber 28. The excess quantity of nitrogen is led away via the duct 11.

This cycle offers the advantage that the $NO_X$ emission quantity generated in the combustion chamber 28 is reduced and, furthermore, that there is less formation of $NO_X$ in the exhaust heat steam generator 28. In addition, the part load efficiency of the combined plant is good because of the auxiliary firing in the exhaust heat steam generator 28. Since a fuel gas/nitrogen mixture 21 is also used for this latter auxiliary firing, the $NO_X$ emission can be still further reduced.

Figure 2:
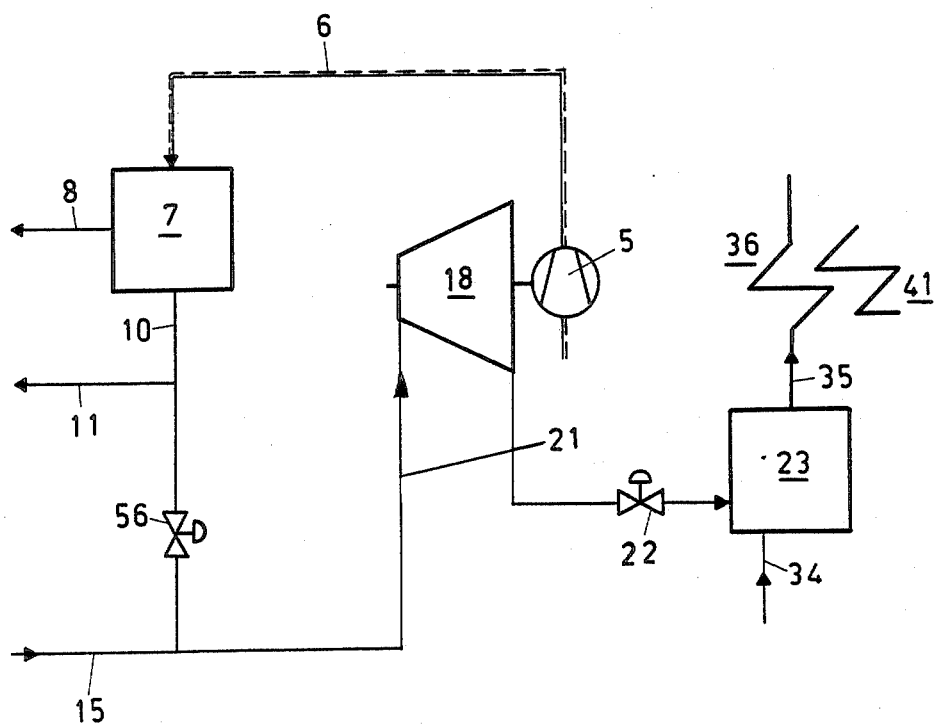
FIG. 2 shows a further cycle, in which the nitrogen expansion turbine drives a compressor, which supplies the air decomposition plant.

FIG. 2 differs from FIG. 1 in that the expansion turbine 18 receives a fuel gas mixture 21. The control valve 56 controls the nitrogen 10/fuel gas 15 ratio. The fuel gas mixture, which can have a pressure between 20 and 100 bar, is expanded to a lower pressure in the expansion turbine 18. The resulting mechanical energy can be converted into electricity or, as shown in FIG. 2, drive a compressor 5, which supplies the air decomposition plant 7 with compressed air 6.

Figure 3:
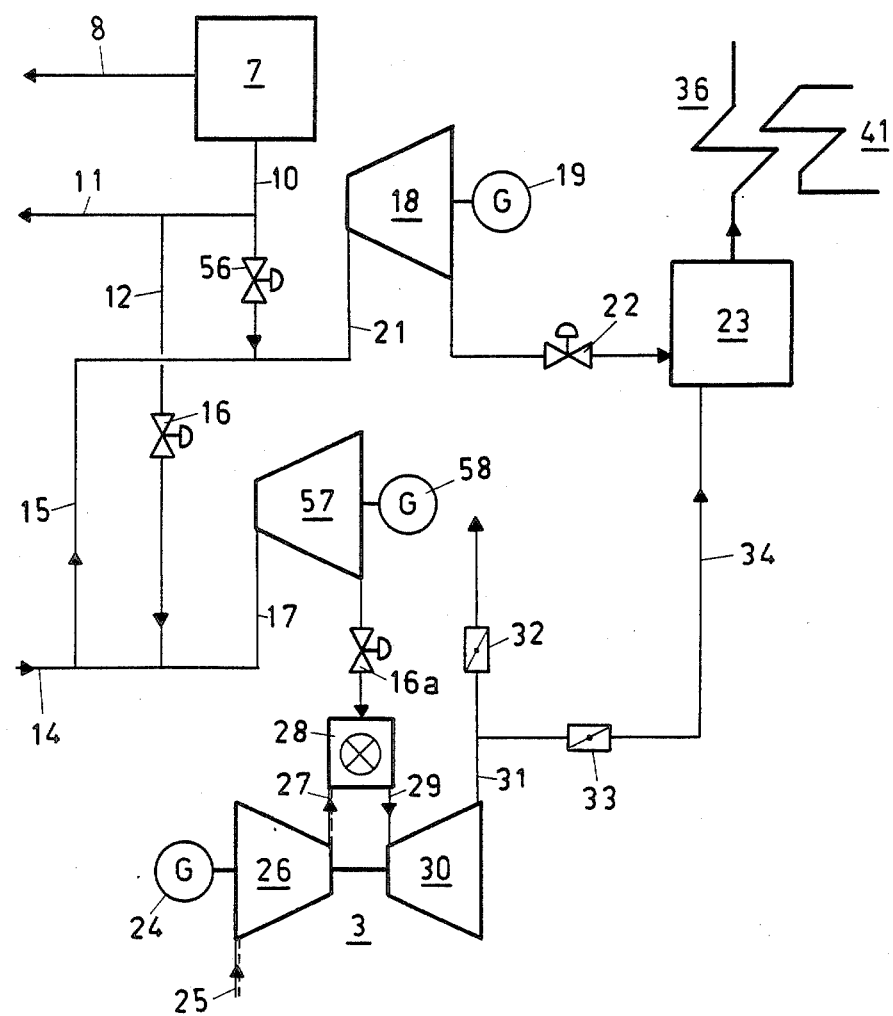
FIG. 3 shows a further cycle, in which two expansion turbines are provided.

FIG. 3 shows the possibility of leading both fuel gas mixtures 17 and 21 individually through expansion turbines 57 and 18 respectively before they are used. The generators 58 and 19 can, of course, be replaced by individual compressors.

Figure 4:
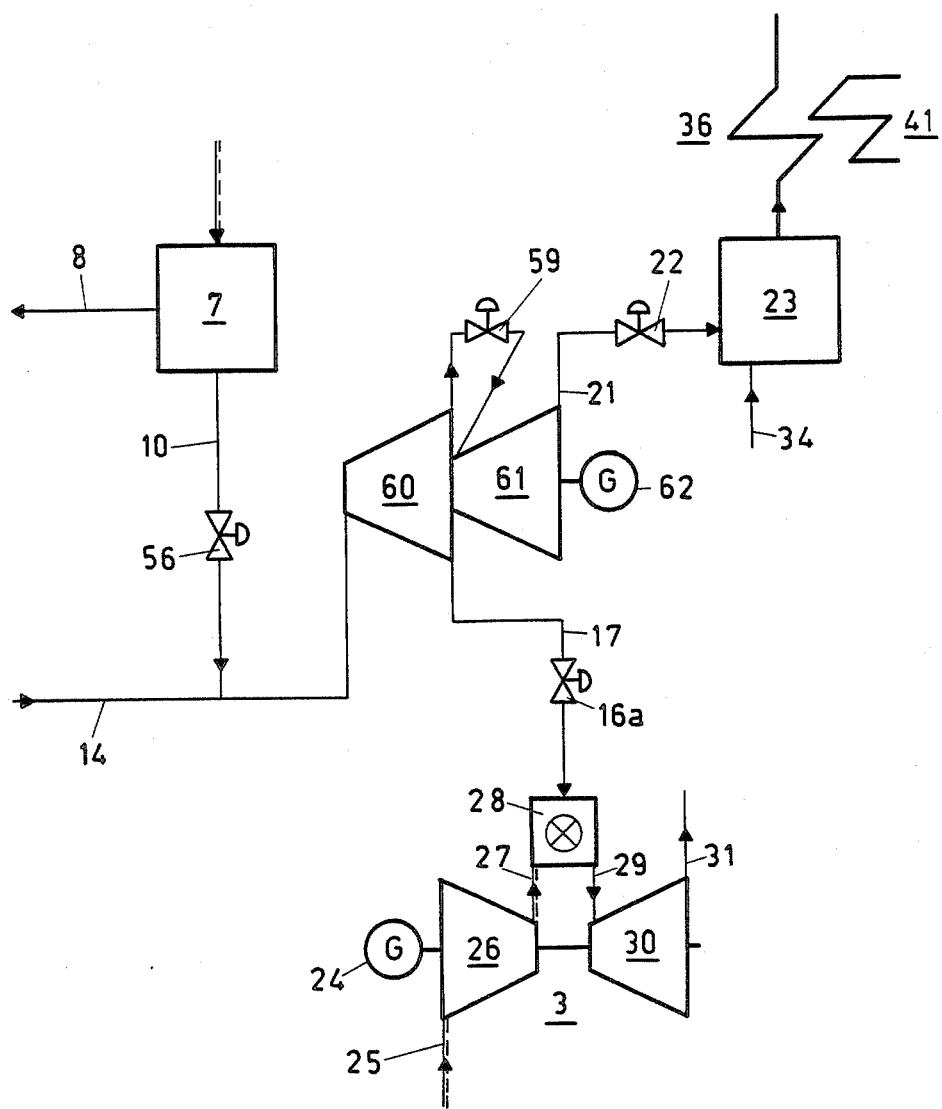
FIG. 4 shows a final cycle, in which the two expansion turbines are integrated in one machine.

In FIG. 4, the fuel gas 14/nitrogen 10 mixture is led through the expansion turbines 60, 61, integrated in one machine. After first being used in expansion turbine 60, the fuel gas mixture 17 flows to the gas turbine combustion chamber 28. A second flow of the fuel gas mixture flows via the control valve 59 back into the expansion turbine 61 and is then fired as fuel gas mixture 21 in the exhaust heat steam generator 23. The expansion turbines 60, 61 drive a generator 62. The latter can, of course, be replaced by a compressor.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not as limiting to the scope and spirit of the invention as set forth in the appended claims.

What is claimed is:

1. A method of operating a combined gas/steam turbine power station plant having a gas turbine, a combustion chamber, a gas generator and an exhaust heat steam generator downstream of the gas turbine, the steam generator provided with a working medium and an auxiliary firing operation for increasing steam turbine power, the auxiliary firing operation and gas turbine combustion chamber operated on a fuel supplied from the gas comprising the steps of:

(a) generating an oxygen supply from an air separation plant, supplying said oxygen to the gas generator, obtaining fuel gas from the gas generator while operating the gas generator by coal gasification, dividing the fuel gas into a first portion and a second portion, and directing the first portion of the fuel gas to said gas turbine combustion chamber and directing the second portion of the fuel gas to the exhaust heat steam generator;

(b) generating a nitrogen supply in the air separation plant, conducting said nitrogen supply away from the air separation plant and dividing said nitrogen supply into a first portion and a second portion;

(c) mixing the first portion of the fuel gas and the first portion of the nitrogen in a predetermined ratio and supplying the mixture to the gas turbine combustion chamber; and (d) mixing the second portion of the fuel gas and the second portion of the nitrogen together in a predetermined ratio and supplying the mixture to the exhaust heat steam generator.

2. The method of claim 1, including delivering the mixture of the fuel gas and the second portion of the nitrogen to an expansion turbine prior to supplying the mixture to the exhaust heat steam generator.

3. The method of claim 2, including driving a compressor with the expansion turbine and supplying the air separation plant with compressed air.

4. The method of claim 1, including delivering the mixture of the fuel gas and the second portion of the nitrogen to an expansion turbine prior to supplying the mixture to the gas turbine combustion chamber.

* * * * *